(12) United States Patent
Sanvido et al.

(10) Patent No.: US 8,430,412 B2
(45) Date of Patent: Apr. 30, 2013

(54) TRANSPORT CARRIAGE FOR INDUSTRIAL PLANTS

(75) Inventors: Alessio Sanvido, Villastellone (IT); Dino Sanvido, Villastellone (IT); Donato Montano, Villastellone (IT); Pietro Bossotto, Villastellone (IT)

(73) Assignee: CO.GE.CAR s.n.c di MONTANO & SANVIDO, Turin (IT)

( * ) Notice: Subject to any disclaimer, the term of this patent is extended or adjusted under 35 U.S.C. 154(b) by 335 days.

(21) Appl. No.: 12/896,221

(22) Filed: Oct. 1, 2010

(65) Prior Publication Data

US 2011/0079973 A1 Apr. 7, 2011

(30) Foreign Application Priority Data

Oct. 1, 2009 (IT) .............................. MI09A000746

(51) Int. Cl.
*B62B 3/00* (2006.01)
(52) U.S. Cl.
USPC .................................... 280/47.11; 280/47.34
(58) Field of Classification Search ............... 280/47.11, 280/137.5, 98, 103
See application file for complete search history.

(56) References Cited

U.S. PATENT DOCUMENTS

| 2,582,000 | A |   | 1/1952 | Bloomstran | |
|---|---|---|---|---|---|
| 2,763,493 | A | * | 9/1956 | Hutchinson | 280/99 |
| 3,410,571 | A | * | 11/1968 | Bishop | 280/99 |
| 3,424,472 | A | * | 1/1969 | Townsend | 280/47.11 |
| 4,003,584 | A | * | 1/1977 | Zelli | 280/81.5 |
| 4,934,726 | A | * | 6/1990 | Daenens et al. | 280/408 |
| 5,899,482 | A | * | 5/1999 | Kimura | 280/445 |
| 6,520,642 | B1 | * | 2/2003 | Chapman | 352/243 |
| 6,554,298 | B1 | * | 4/2003 | Bidwell | 280/47.11 |

(Continued)

FOREIGN PATENT DOCUMENTS

FR 2 217 950 9/1974

OTHER PUBLICATIONS

European Search Report issued Feb. 14, 2011 in connection with EP App No. 10160171.4.

(Continued)

*Primary Examiner* — Katy M Ebner
(74) *Attorney, Agent, or Firm* — Nixon & Vanderhye P.C.

(57) ABSTRACT

A transport carriage for industrial plants comprises a bearing structure mounted on a plurality of wheel units pivoting around respective vertical axes. The wheel pivoting units are connected by means of kinematisms to a single control plate mounted articulated around a vertical axis. The control plate may be maneuvered by means of a steering unit including a steering plate which is mounted articulated around the same articulation axis of the control plate. The steering unit is provided with a vertical bar suitable to be engaged into a hole of the steering plate and into any one among the two holes of control plate (5) to join the plates integrally in the rotation around the articulation axis thereof. When the engagement member is inserted into the abovementioned first hole, the wheels of the carriage are prearranged for movement in the normal advancement direction, with the possibility of steering within a limited angular field. When the engagement bar is inserted into the second hole the steering unit may be maneuvered over a greater angular field, which allows directing the wheels of the pivoting units in an orthogonal direction with respect to direction A.

4 Claims, 10 Drawing Sheets

U.S. PATENT DOCUMENTS

| | | | |
|---|---|---|---|
| 6,722,675 B2 * | 4/2004 | Bidwell | 280/89 |
| 7,530,582 B2 * | 5/2009 | Truchsess et al. | 280/87.021 |
| 7,703,561 B2 * | 4/2010 | Miyajima et al. | 180/6.24 |
| 7,909,122 B2 * | 3/2011 | Schena et al. | 180/19.1 |
| 8,020,880 B2 * | 9/2011 | Zhu | 280/47.11 |
| 2003/0132591 A1 * | 7/2003 | Woodbury | 280/47.34 |
| 2004/0239060 A1 | 12/2004 | Faucher et al. | |

OTHER PUBLICATIONS

Italian Search Report for Italian Patent Application No. TO2009A000746, dated May 18, 2010.

Italian Written Opinion for Italian Patent Application No. TO2009A000746, dated Oct. 1, 2009, 5 pages.

* cited by examiner

TRANSPORT CARRIAGE FOR INDUSTRIAL PLANTS

This application claims priority to IT Application No. TO2009A000746 filed 1 Oct. 2009, the entire contents of which is hereby incorporated by reference.

DESCRIPTION TEXT

Background of the Invention

The present invention refers to carriages for transporting pieces or components in industrial plants, of the type comprising a bearing structure mounted on wheels. Carriages of this type are used separately or connected to each other, and they are pushed or drawn manually or by means of tow vehicles for transporting pieces or components in an industrial plant, at various stations of an assembly line, such as for example a line for producing automobiles.

SUMMARY OF THE INVENTION

The object of the present invention is that of providing a carriage of the type outlined above which, alongside being moved in the normal advancement direction, has an additional function which allows moving the carriage according to a transverse direction orthogonal to normal advancement direction, in such a manner to allow positioning it close to a station of the assembly line in a quick manner and requiring least space for manoeuvre.

Another object of the invention is that of obtaining a carriage having the additional functionality indicated above and which simultaneously has a steering capacity within a limited angular field when it is used to move according to the normal advancement direction.

Another further object of the invention is that of providing a carriage having the characteristics specified above which also has a structure that is relatively simple and inexpensive.

With the aim of attaining such objects, the invention has the object of a transport carriage for industrial plants, comprising a bearing structure mounted on wheels, characterised in that the wheels of the carriage are part of a plurality of wheel units pivoting around respective vertical axes, and in that said carriage further comprises:

- a plate for controlling the wheel pivoting units, mounted articulated around a vertical axis on the bearing structure of the carriage and connected to the abovementioned wheel pivoting units by means of respective kinematisms, in such a manner that each angular position of said control plate corresponds to a determined angular position of each wheel pivoting unit, and
- a steering unit comprising a steering member mounted articulated on the bearing structure of the carriage around the same axis articulation of the abovementioned control plate, said steering member being connectable rigidly to said control plate with respect to the rotation movements around said articulation axis by means of an engagement member borne by the steering unit and selectively insertable into a first hole or into a second hole of the abovementioned control plate. The abovementioned arrangement is such that when the abovementioned engagement member is inserted into the above-mentioned first hole, the wheels of the wheel pivoting units are all directed towards a normal advancement direction of the carriage, with the possibility of steering within a limited angle, while when said engagement member is inserted into said second hole of the control plate, the wheels of the carriage are all directed according to a direction at 90° with respect to the abovementioned normal advancement direction, to allow the movement of the carriage transverse with respect to the abovementioned normal advancement direction.

BRIEF DESCRIPTION OF THE DRAWINGS

Now, the invention shall be described with reference to the attached drawings, strictly provided for exemplifying and non-limiting purposes, wherein.

DETAILED DESCRIPTION OF THE INVENTION

Figure 1:
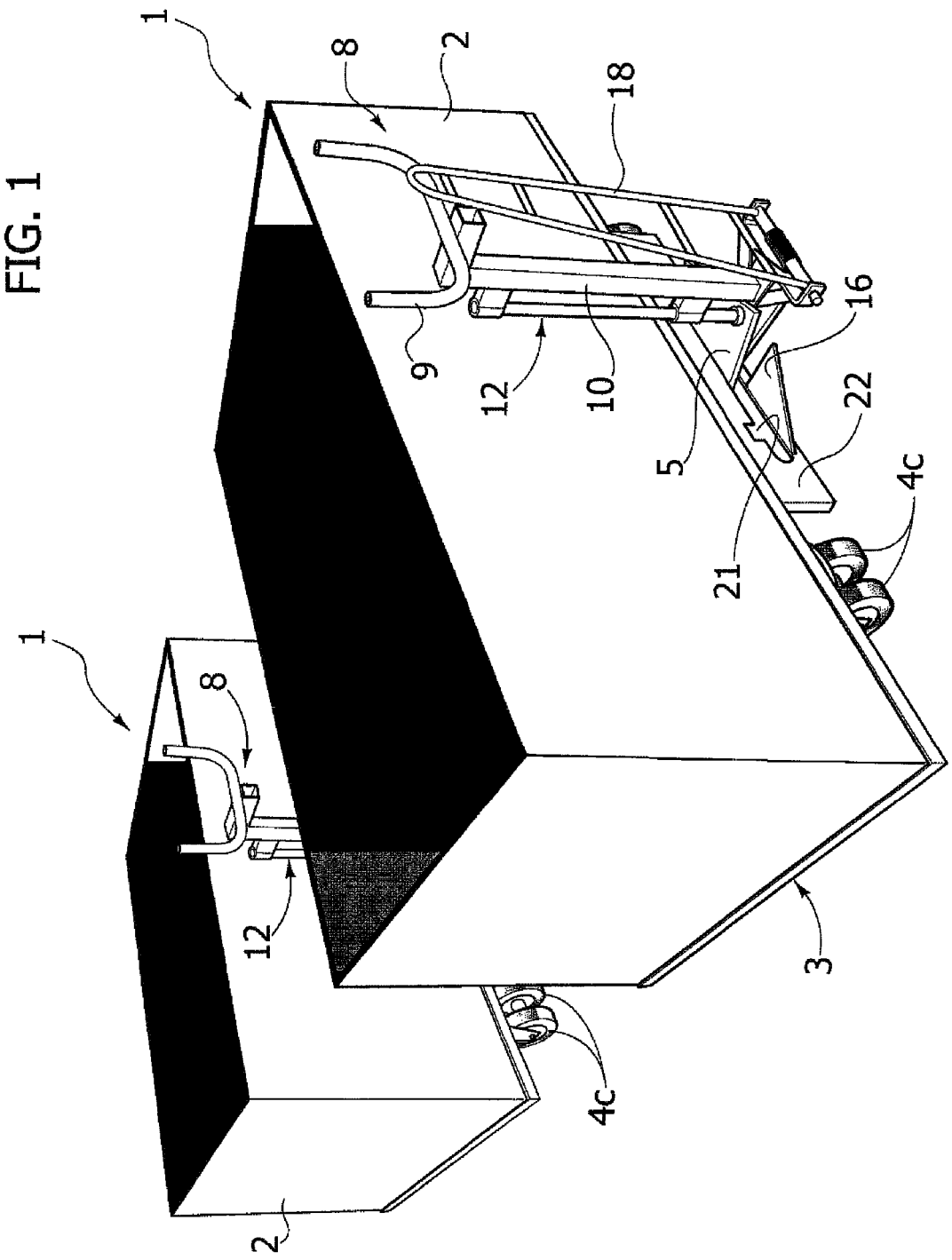
FIG. 1 is a schematic perspective view showing two carriages according to the invention connected to each other.

In FIG. 1, two carriages according to the invention, each comprising a container 2 intended to receive pieces or components to be transported in an industrial plant are indicated in their entirety with 1. The structure and the configuration of the container 2 may be of any kind. The container 2 is mounted on a bearing structure 3 better observable in FIG. 2 (where the container was removed). In the illustrated example, the bearing structure 3 is made up of a metal framework mounted on four wheel units 4 mounted pivoting around respective vertical axes 4a. The illustrated example shows four wheel pivoting units, but it is possible to provide for a higher number of wheel units, or even a smaller number (for example three wheel units). Advantageously, in the case of the illustrated example, the four axes 4a of the wheel pivoting units 4 are aligned two by two with respect to each other both in the normal advancement direction of the carriage, indicated with A in FIG. 2, and in a transverse direction directed at 90° with respect to direction A and indicated with T in FIG. 2. Still in the case of the illustrated example, each unit 4 comprises a pair of dual wheels 4c which are supported in a freely rotating manner by arms projecting at the lower part from an upper support plate 4b, which is mounted articulated against the framework forming the bearing structure 3. It is however clear that each unit 4 could for example comprise only one wheel 4c and that, furthermore, the means for supporting the wheel or wheels of each unit in a pivoting manner with respect to the framework 3 may also be of any type.

The angular position of each wheel pivoting unit 4 is controlled in a unique manner by a single control plate 5 which is mounted articulated onto the framework 3 around a vertical axis 5a. As observable for example in FIGS. 2 and 3, the control plate 5 is connected to the four wheel pivoting units 4 by means of pantograph kinematisms. In particular, with reference to FIG. 3, provided for are two pairs of articulated arms 6, 7. Each of the two arms 6 has an end 6a thereof articulated around a vertical axis to the control plate equally spaced with respect to the axis 5a. The opposite ends 6b of the arms 6 are articulated to the plates 4b of the units for pivoting arranged at the front side of the carriage (i.e. on the lower side in FIG. 3). The other pair of articulated arms 7 connects the plates 4b of the two units 4 arranged on the front side of the carriage with the plates 4b of the two units 4 arranged on the rear side (i.e. on the upper side in FIG. 3). Each articulated arm 7 has an end 7a articulated around a vertical axis to the plate 4b of a unit 4 on the front side of the carriage, the articulation axis of the end 6b and 7a being arranged equally spaced from the axis 4a of the pivoting unit.

The abovementioned arrangement is configured and dimensioned in such a manner that each of the positions of the control plate 5 corresponds to one and only one angular position of each pivoting unit 4, according to a criterion to be clarified hereinafter.

Figure 2:
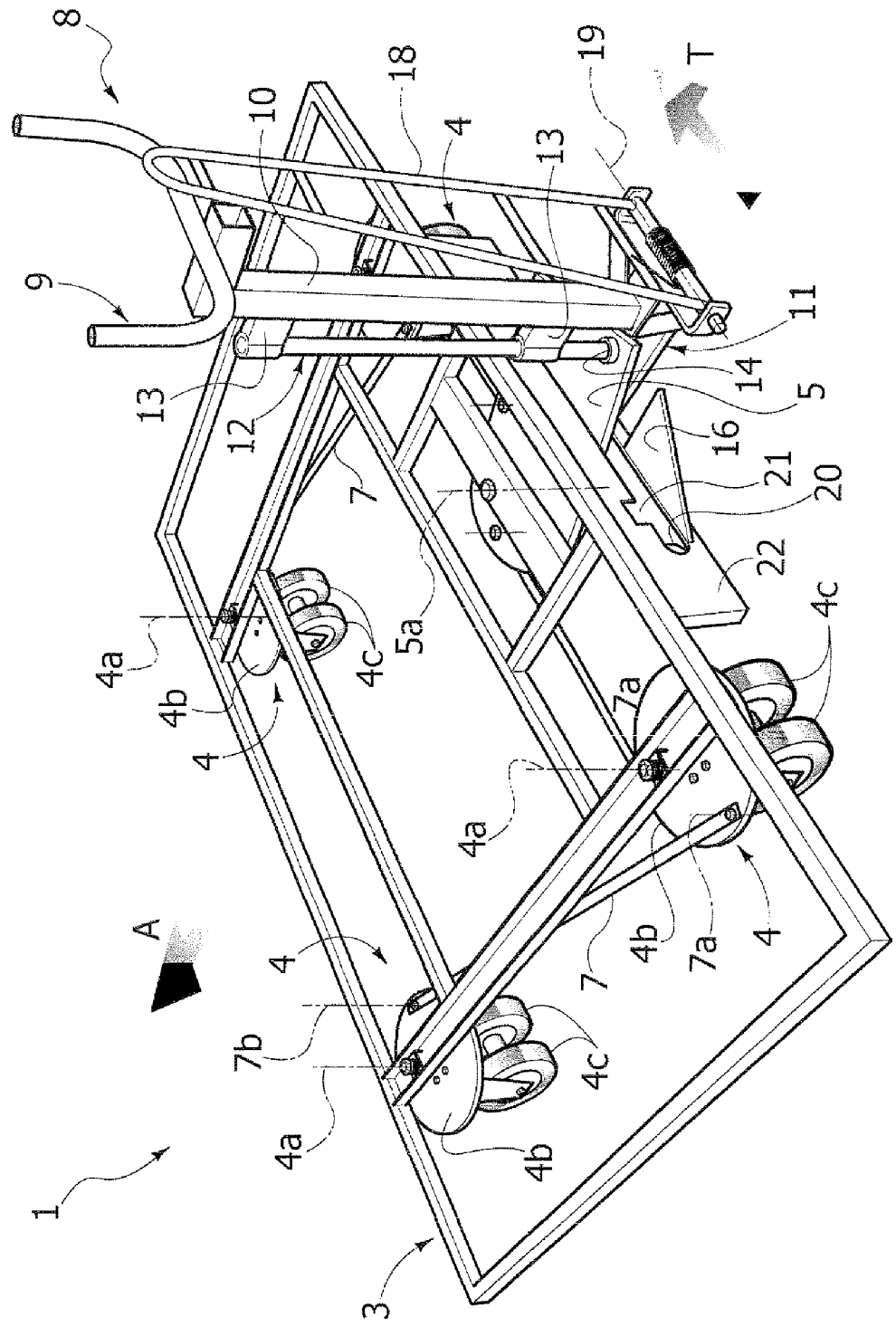
FIG. 2 is a perspective view of the bearing structure of a preferred embodiment of the carriage according to the invention.
Figure 3:
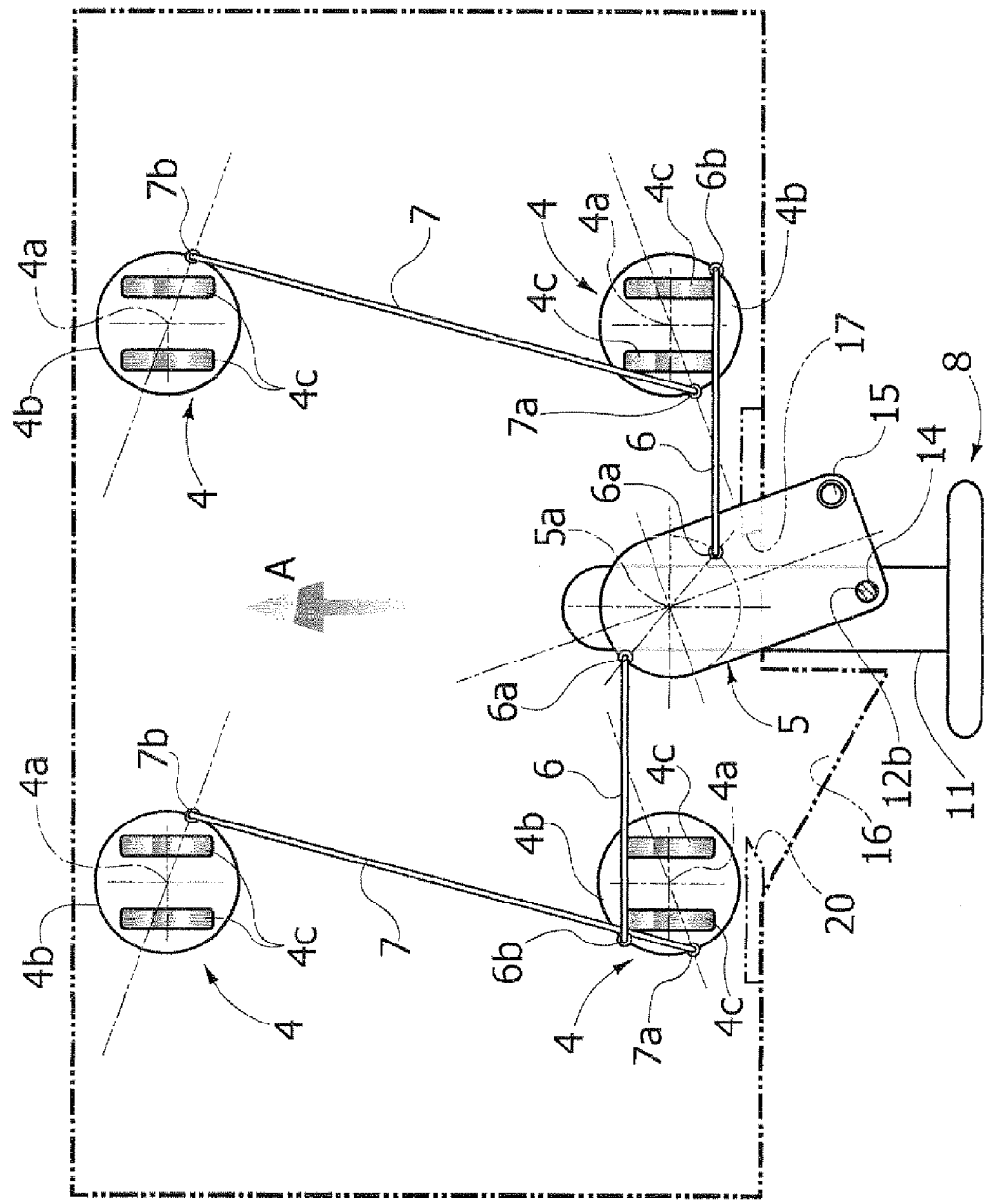
FIG. 3 is a plan schematic view showing the wheel pivoting units of the carriage according to the invention directed to move towards the normal advancement direction.

Still referring to FIG. 2, the carriage 1 comprises a steering unit 8 including a handle bar 9, which may obviously be shaped to will, borne at the upper end of an upright 10 whose lower end is secured to a steering member 11. The steering member 11 is made up of a horizontal plate having a substantially elongated shape which is arranged beneath the control plate 5 and it is also mounted articulated on the framework 3 of the carriage around the same axis 5a for articulating the control plate 5, in an entirely independent manner with respect to the plate 5.

Figure 6:
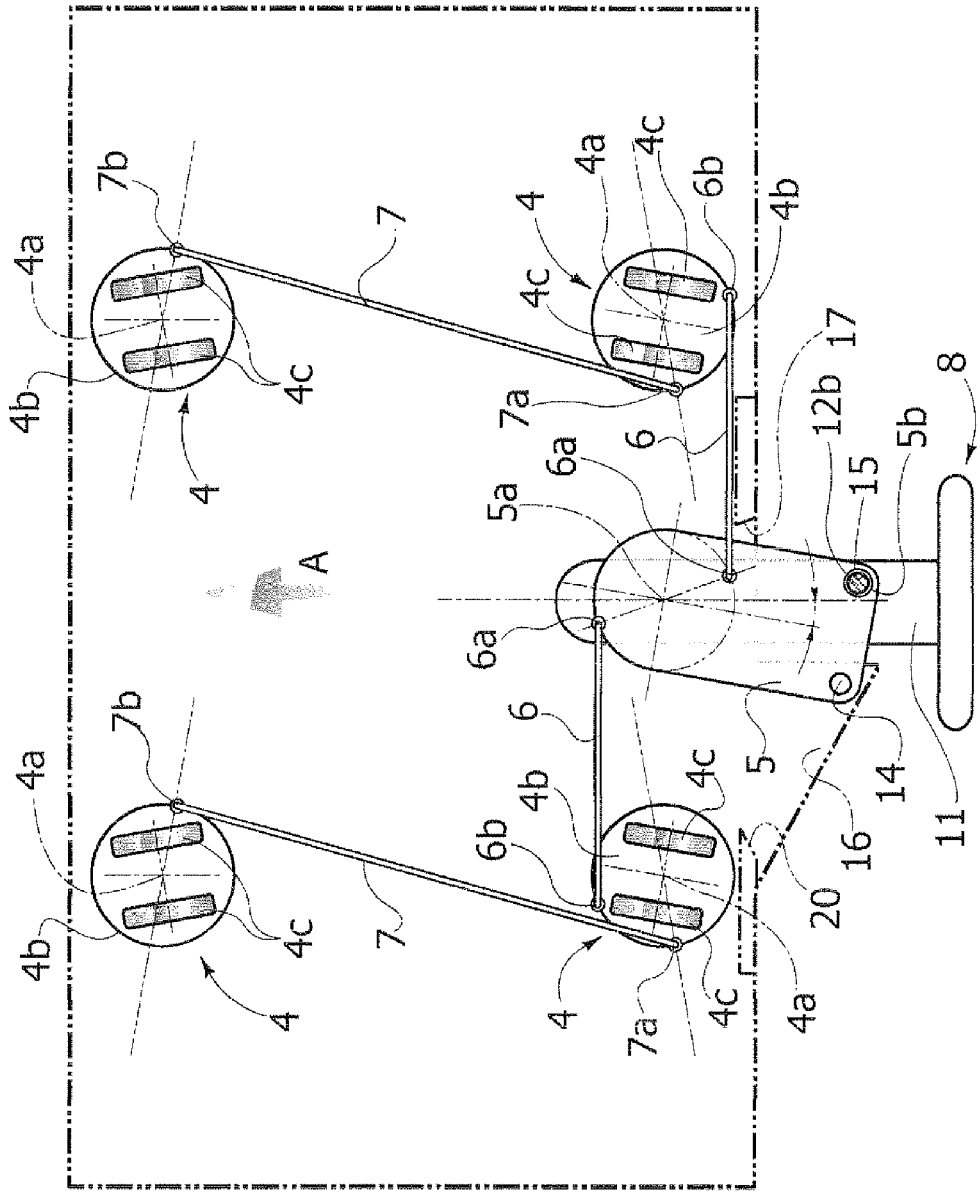
FIG. 6 is a further schematic plan view showing the carriage prepared for the rotation of the wheel pivoting units towards the position directed in the direction transverse to the normal advancement direction.
Figure 7:
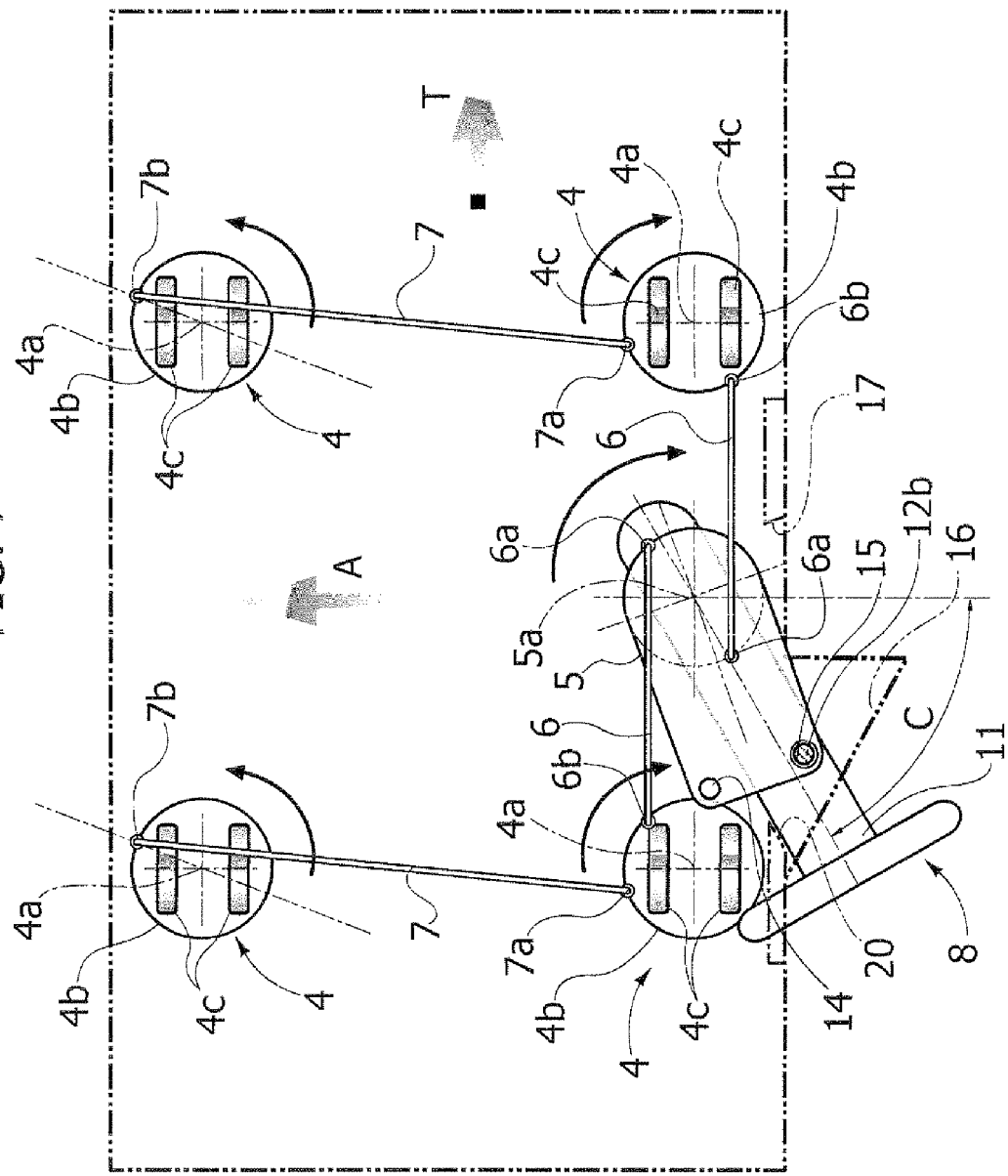
FIG. 7 is a further plan view showing the wheel pivoting units directed in the direction transverse to the normal advancement direction.
Figure 8:
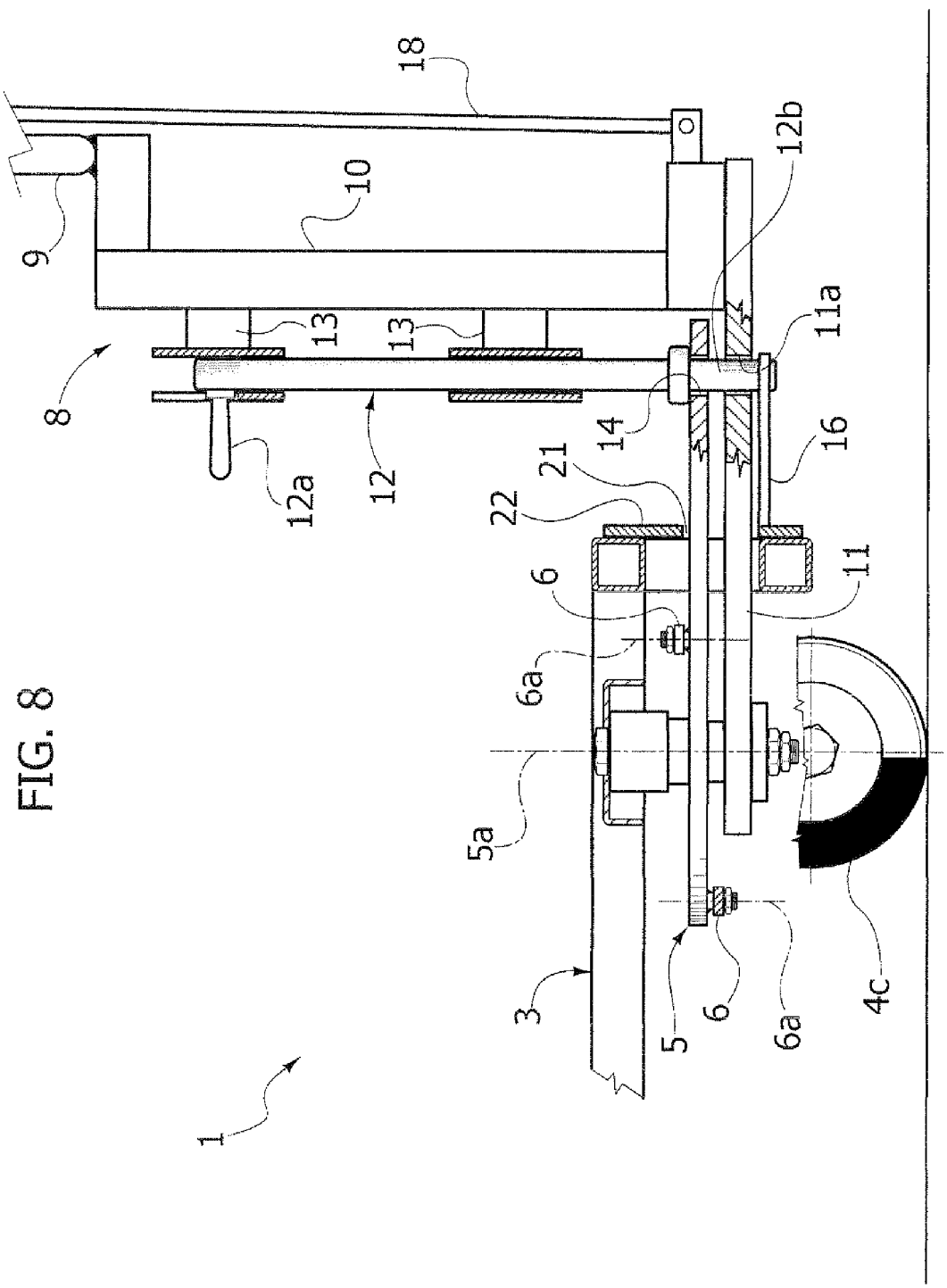
FIGS. 8, 9 are partial lateral and elevational views, partly sectioned, of the carriage according to the invention respectively in the conditions illustrated in FIG. 3 and in FIG. 7.
Figure 9:
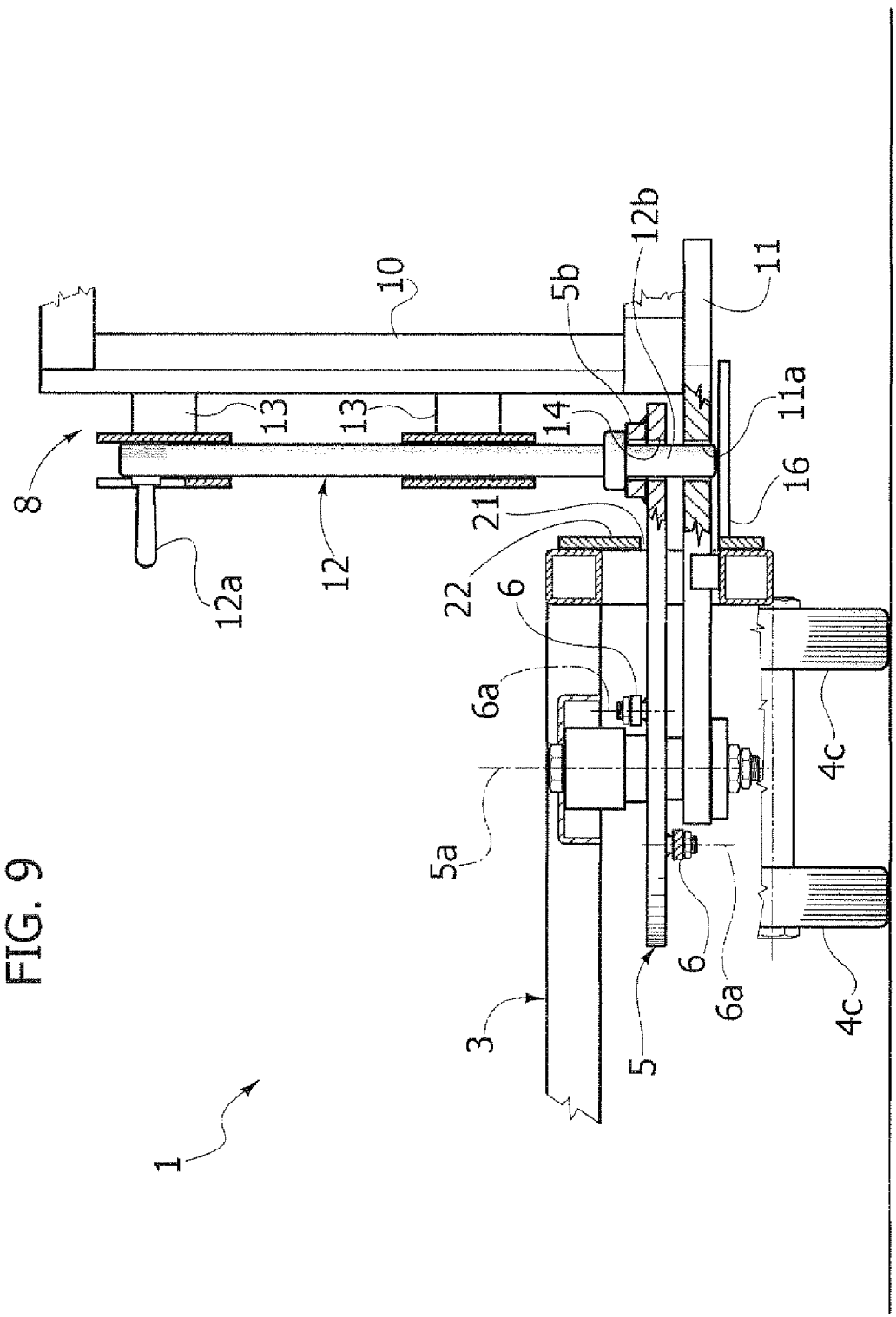

The control plate 5 and the steering member 11 may be joined integrally with respect to the rotating movements around the articulation axis 5a by means of an engagement member 12 (see FIG. 2 again), which in the illustrated example is made up of a vertical cylindrical bar vertically slidingly borne by supports 13 projecting cantilevered from the upright 10 (see also FIGS. 8, 9). Referring to such figures, the bar 12 is provided at the upper part with a handgrip 12a which allows manoeuvring the bar between a raised position and a lowered position. In the above-mentioned lowered position, the lower end 12b of the vertical bar 12 is suitable to selectively engage any of the two holes 14, 15 obtained in the control plate 5 equally spaced from the articulation axis 5a. It should however be observed that, referring to the FIGS. 8, 9 when the bar 12 is inserted into the hole 14 of the plate 5 it is capable of also passing through a hole 11a obtained in the steering plate 11 and protruding from the lower part of the latter as observable in FIG. 8. On the contrary, when the bar 12 is inserted into the hole 15 (condition illustrated in FIGS. 6, 7) it once again engages the hole 11a of the steering plate 11 (FIG. 9) but it does not protrude for a considerable distance beneath the plate 11, in that a collar 12b of the bar 12 lies on a spacer ring 5b welded on the plate 5 coaxially to the hole 15.

Referring to FIG. 3, when the bar 12 is engaged into the hole 14 of the control plate 5, as well as into the hole 11a of the steering plate 11, the control plate 5 and steering plate 11 are integrally joined with respect to the rotations around the axis 5a, the respective positioning of the two plates being such that when the steering unit 8 is aligned straight in the normal advancement direction A, the wheel pivoting units 4 have their wheels aligned in direction A, in such a manner to allow the normal movement of the carriage in such direction. However, in such operating mode, the steering unit 8 may be moved leftwards or rightwards with respect to the aligned central position of FIG. 3 (see FIGS. 4, 5) in a limited angular field (±20° in the case of the illustrated example). Such result is obtained in that the stop position leftwards of the steering unit 8 (see FIG. 4) is defined by the engagement of the lower end of the bar (which in this case projects beneath the plate 11, as indicated above) against a stop plate 16 clearly illustrated in FIGS. 2, 8 and also schematically indicated in FIGS. 3-5. As observable, in such stop condition, visible in FIG. 4, the steering unit is turned leftwards by an angle B, which as mentioned is equivalent to 20° in the case of the illustrated example. Still referring to the operating mode with a bar 12 engaged in the hole 14, the steering unit 8 may be moved rightwards until it reaches a stop position observable in FIG. 5, defined by the engagement of the right edge (with reference to the figure) of the steering plate 11 against a stop surface 17 defined by the framework 3.

Figure 4:
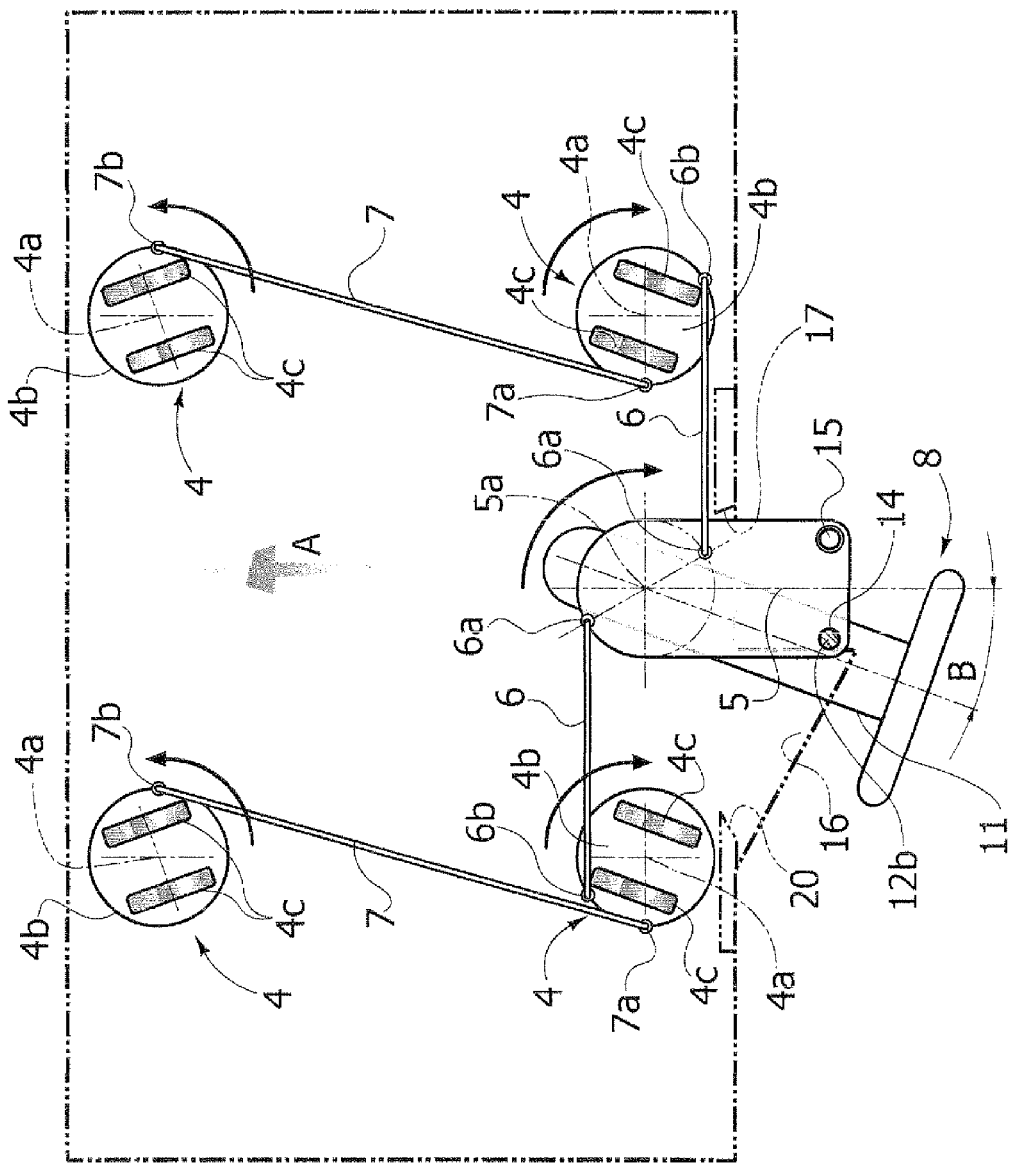
FIGS. 4, 5 are views corresponding to those of FIG. 3 which shows the steering capacity of the wheel pivoting units for a limited angle, leftwards and rightwards with respect to the normal advancement direction, during movement in such direction.
Figure 5:
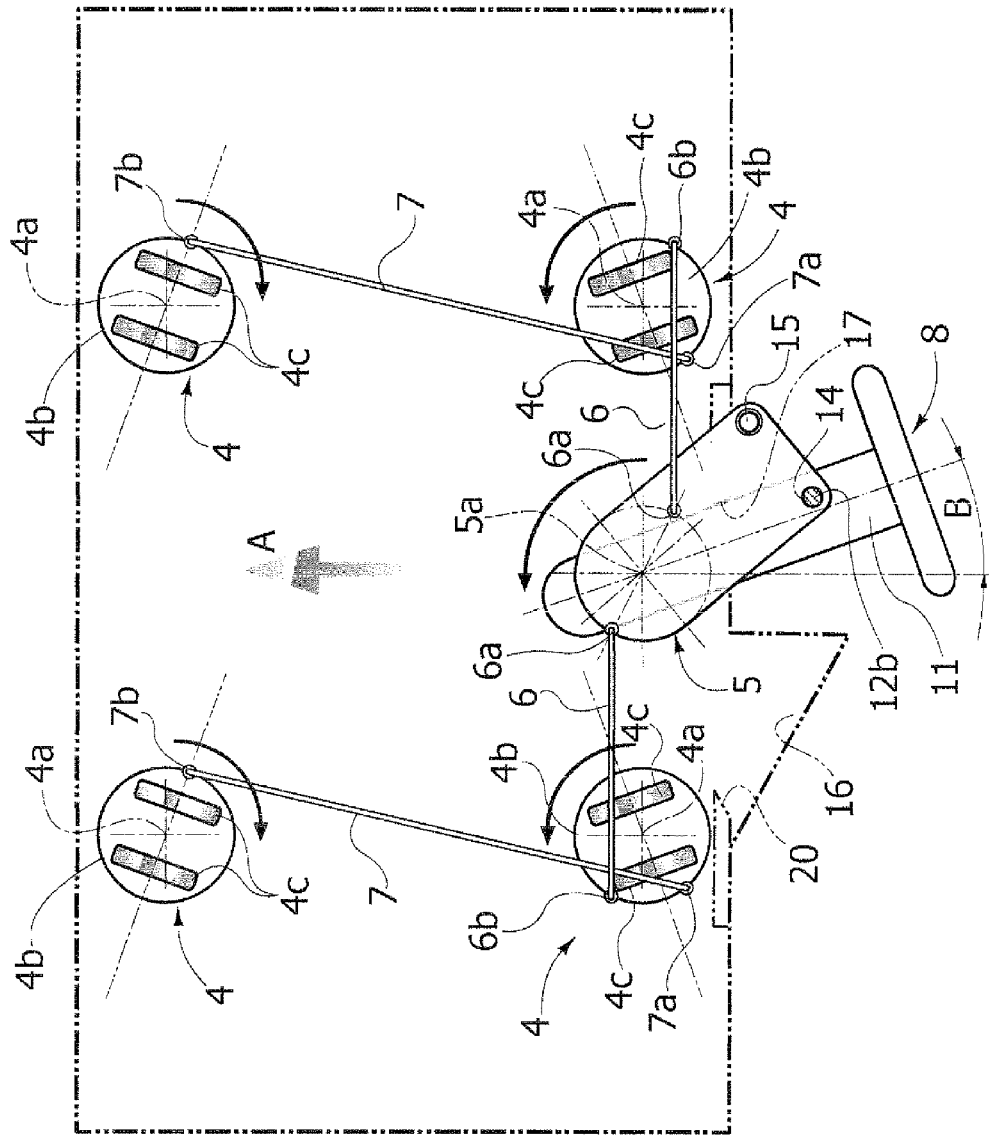

As clearly observable in FIGS. 4, 5, in the abovementioned mode of advancing the carriage in direction A, the wheels of the pivoting units may thus be steered by an angle B, rightwards and leftwards with respect to direction A, such angle being equivalent to 20° in the case of the illustrated example. Such steering possibility obviously allows manoeuvring the carriage in an optimal manner when it is advanced in direction A, separately or coupled to other carriages.

FIG. 2 also shows a structure 18 for hooking the carriage to an adjacent carriage, mounted articulated to the base thereof around a horizontal axis 19 to the structure of the steering unit, in such a manner to be moveable between a raised inoperative position (illustrated in FIG. 2) and a lowered operative position wherein it can be hooked to another carriage, using any kind of means.

Should the carriage be translated in a direction T orthogonal to the normal advancement direction A, the bar 12 is raised to remove it from the hole 14 of the control plate 5 and the steering unit is moved to align the hole 11a of the steering plate 11 with the hole 15 of the control plate 5. In such condition, illustrated in FIG. 6, the bar 12 is once again lowered until it reaches the position illustrated in FIG. 9, wherein the control plate 5 and the steering plate 11 are once again integrally joined to each other with respect to the rotation movements around the articulation axis 5a. However, in such condition the steering unit 8 may be turned over the entire angular field indicated with C in FIG. 7, in such a manner to move it from the position illustrated in FIG. 6 to the stop position illustrated in FIG. 7 defined by the engagement of the left edge (with reference to FIG. 7) of the steering plate 11 against a stop surface 20 defined by the framework 3, schematically illustrated in FIGS. 3-7 and better observable in FIG. 2. In the case of the illustrated example both the stop surface 20 and stop surface 17 are defined by the ends of a slot 21 (FIG. 2) obtained in a plate 22 arranged on the front side of the framework 3, the slot 21 being passed through by the plates 5 and 11, as clearly illustrated in FIGS. 2 and 8, 9.

As clearly outlined by the description above, the carriage according to the invention may be conceived for a first operating mode, for moving in the normal advancement direction, or in a second operating mode, wherein the wheels are oriented to move the carriage in an orthogonal direction with respect to the normal advancement direction. In such manner, once positioned halfway the travel thereof inside the industrial plant, the carriage may be moved transversely, thus saving energy and manoeuvring space. Furthermore, in the normal operating mode, the carriage still has the possibility of steering within a limited angle, for example of 20° rightwards and leftwards with respect to the advancement direction. All the above-mentioned results are attained by means of an extremely simple, reliable and inexpensive structure.

Figure 10:
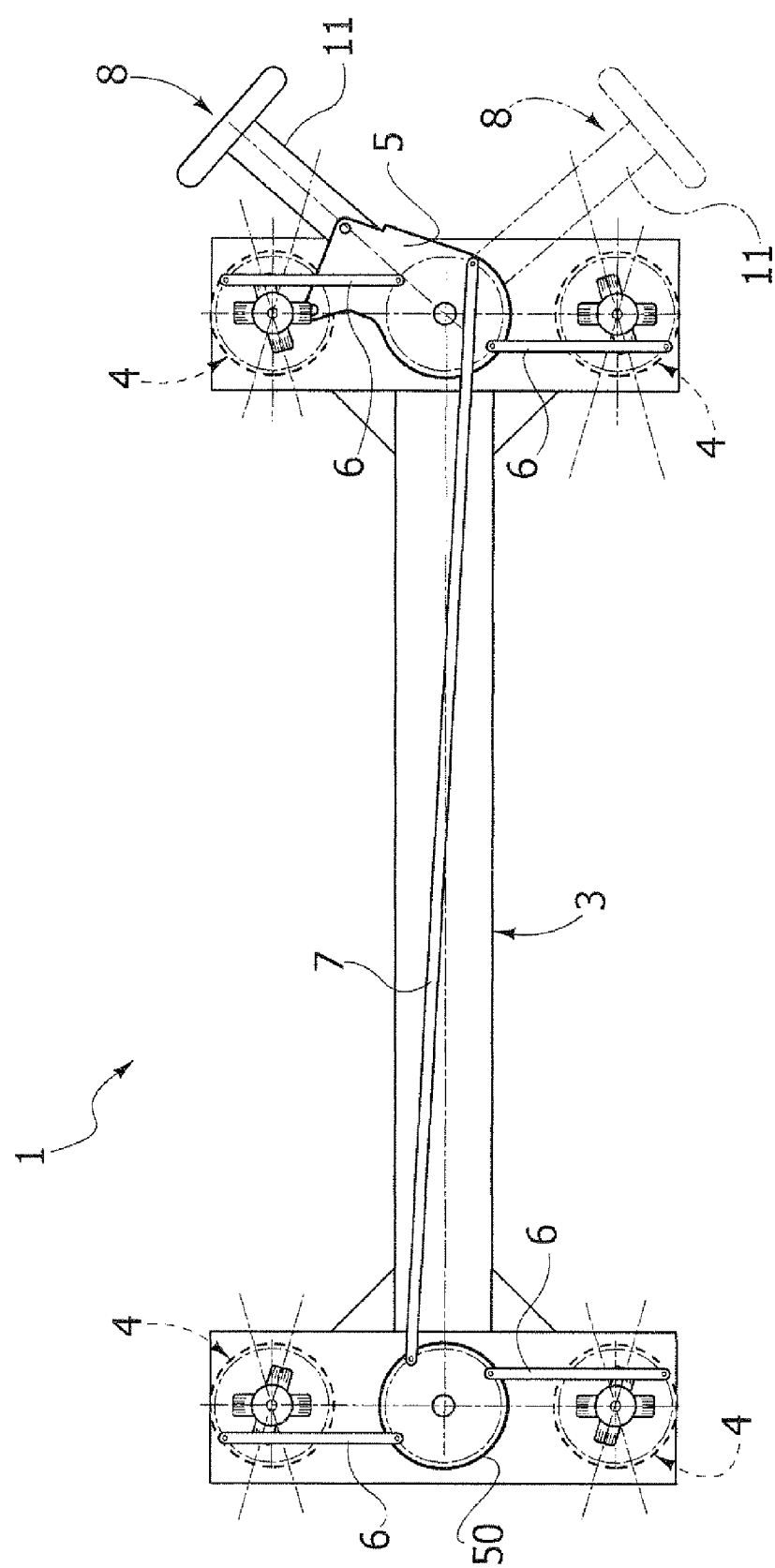
FIG. 10 is a view similar to FIG. 7 relating to a variant.

FIG. 10 shows a variant using a different kinematism, with a single articulated arm 7 and two pairs of articulated arms 6. Arm 7 is connected at one end to plate 5 and, at an opposite end, to an auxiliary plate 50 which is freely rotatably mounted on the structure 3 and connected to two wheel units 4 by a pair of arms 6.

Obviously, without jeopardising the principle of the invention, the manufacturing details and the embodiments may widely vary with respect to what has been described and illustrated strictly for exemplifying purposes, without departing from the scope of the present invention.

What is claimed is:

1. Carriage for transporting pieces or components in an industrial plant, comprising a bearing structure mounted on wheels, wherein the wheels of the carriage are part of a plurality of wheel units pivoting around respective vertical axes, and wherein said carriage further comprises:
   a plate for controlling wheel pivoting units, mounted so as to be articulated around a vertical axis on the bearing structure of the carriage and connected to wheel pivoting units by respective kinematisms, in such a manner that each angular position of the control plate corresponds to a determined angular position of each wheel pivoting unit, and
   a steering unit comprising a steering member mounted so as to be articulated on the bearing structure of the carriage around the same articulation axis of the control plate,
   said steering unit being rigidly connectable to said control plate with respect to the rotation movements around said articulation axis by means of an engagement member borne by the steering unit and selectively insertable into a first hole or into a second hole of the control plate,
   the abovementioned arrangement being such that:
   when said engagement member is inserted into said first hole the wheels of the pivoting units are oriented in a normal advancement direction of the carriage, with the possibility of steering within a limited angle, and
   when said engagement member is inserted into said second hole, the steering member may be moved to a position wherein the wheels of the pivoting units are directed in a direction at 90° with respect to the abovementioned direction of normal advancement of the carriage, to allow a movement of the carriage in said transverse direction.

2. Carriage according to claim 1, wherein said steering member is made up of a plate arranged beneath the control plate and wherein the abovementioned engagement member passes through a hole of said steering plate when it is in the position of engaging the control plate, both when it is in the first hole, and in the second hole.

3. Carriage according to claim 2, wherein said engagement member is made up of a vertical bar and wherein when the vertical bar is engaged in the abovemenoted first hole, the lower end of the said vertical bar projects beneath the steering plate, while when the vertical bar is engaged in the abovementioned second hole, the lower end thereof does not project considerably beneath the steering plate.

4. Carriage according to claim 3, wherein when the abovementioned vertical bar is engaged in the abovementioned first hole, the lower end thereof projecting beneath the steering plate cooperates with a stop means borne by the bearing structure of the carriage, in such a manner to limit the angular field of steering in the mode of moving the carriage in the normal advancement direction, while when the vertical bar is inserted into said second hole, its lower end is beyond the possibility of interfering with the abovementioned stop means, hence the steering unit may be turned over an angular field sufficient to cause the rotation of the wheel pivoting units up to the position wherein the wheels are aligned in the transverse direction of movement.

* * * * *